United States Patent
Sevak et al.

(10) Patent No.: US 11,679,685 B2
(45) Date of Patent: Jun. 20, 2023

(54) TRACTION BATTERY PACK SERVICE PANEL

(71) Applicant: Ford Global Technologies, LLC, Dearborn, MI (US)

(72) Inventors: Manan Prafulchandra Sevak, Southfield, MI (US); Patrick Daniel Maguire, Ann Arbor, MI (US); George Albert Garfinkel, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1080 days.

(21) Appl. No.: 15/869,509

(22) Filed: Jan. 12, 2018

(65) Prior Publication Data

US 2019/0221800 A1  Jul. 18, 2019

(51) Int. Cl.
| | |
|---|---|
| *B60L 50/64* | (2019.01) |
| *H01M 50/262* | (2021.01) |
| *H01M 50/271* | (2021.01) |
| *H01M 50/227* | (2021.01) |
| *H01M 50/224* | (2021.01) |

(52) U.S. Cl.
CPC .......... *B60L 50/64* (2019.02); *H01M 50/224* (2021.01); *H01M 50/227* (2021.01); *H01M 50/262* (2021.01); *H01M 50/271* (2021.01); *H01M 2220/20* (2013.01)

(58) Field of Classification Search
CPC ............ H01M 2/1083; H01M 2/1077; H01M 2220/20; H01M 50/271; B60L 50/64
See application file for complete search history.

(56) References Cited

U.S. PATENT DOCUMENTS

| | | | |
|---|---|---|---|
| 3,560,266 A | 2/1971 | Mossford | |
| 4,474,304 A | 10/1984 | Jacobs | |
| 4,562,125 A | 12/1985 | Davis | |
| 6,007,941 A | 12/1999 | Hermann et al. | |
| 6,696,196 B1 | 2/2004 | Eilers | |
| 9,246,148 B2 | 1/2016 | Maguire | |
| 9,590,216 B2 | 3/2017 | Maguire et al. | |
| 2003/0047366 A1 | 3/2003 | Andrew et al. | |
| 2001/0251872 | 12/2004 | Wang et al. | |
| 2007/0022682 A1* | 2/2007 | Morgenegg | E04B 2/90 52/235 |
| 2013/0037336 A1* | 2/2013 | Ojeda | H01M 50/249 180/68.5 |

(Continued)

OTHER PUBLICATIONS

U.S. Appl. No. 15/381,586, filed Jan. 27, 2017.

*Primary Examiner* — Allison Bourke
*Assistant Examiner* — Jason Barton
(74) *Attorney, Agent, or Firm* — David B. Kelley; Carlson, Gaskey & Olds, P.C.

(57) ABSTRACT

An exemplary battery assembly includes, among other things, an enclosure defining an interior, and a frame disposed within a wall of the enclosure. The frame includes at least one retention feature configured to hold a service panel in a position where the service panel covers an opening to the interior. An exemplary method includes, among other things, transitioning a service panel to an engaged position with at least one retention feature to secure the service panel in a position where the service panel covers an opening in an enclosure. The at least one retention feature is provided by a frame disposed within a wall of the enclosure.

13 Claims, 7 Drawing Sheets

(56) References Cited

U.S. PATENT DOCUMENTS

2013/0071708 A1 3/2013 Delans
2015/0079458 A1* 3/2015 Maguire ............ H01M 2/1083
  429/163
2017/0217389 A1* 8/2017 Macaraeg ............ B60R 16/033

* cited by examiner

TRACTION BATTERY PACK SERVICE PANEL

TECHNICAL FIELD

This disclosure relates to a service panel and, more particularly, to attaching a service panel such that the service panel covers a service opening in an enclosure of a traction battery pack.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery pack can be used to selectively power the electric machines and other electrical loads of the electrified vehicle. The traction battery can be mounted external to a vehicle body structure. The traction battery pack includes multiple interconnected battery cells and other components housed within an enclosure. The battery cells store energy for powering the electrical loads.

Traditionally, enclosures have been a metal or metal alloy. Some enclosures are now polymer-based. From time to time, servicing components through an opening within the enclosure may be required.

SUMMARY

A battery assembly according to an exemplary aspect of the present disclosure includes, among other things, an enclosure defining an interior, and a frame disposed within a wall of the enclosure. The frame includes retention features configured to hold a service panel in a position where the service panel covers an opening to the interior.

In a further non-limiting embodiment of the foregoing assembly, the enclosure is a polymer-based material and the frame is a metal or metal alloy.

In a further non-limiting embodiment of any of the foregoing assemblies, the wall is molded about at least a portion of the frame such that the frame is in-molded with the wall.

In a further non-limiting embodiment of any of the foregoing assemblies, the frame extends about a perimeter of the opening.

A further non-limiting embodiment of any of the foregoing assemblies includes a service lid of the wall bounded by the frame. The service lid of the wall is configured to be separated from other portions of the wall to provide the opening.

A further non-limiting embodiment of any of the foregoing assemblies includes a tear strip of the wall bounded by the frame. Separating the tear strip from the wall separates the service lid from other portions of the wall.

In a further non-limiting embodiment of any of the foregoing assemblies, a serviceable component is secured to a side of the service lid that faces the interior. A replacement component is secured to a side of the service panel. The replacement component is configured to replace the serviceable component when the service lid of the wall is separated from the other portions of the wall and the service panel is held in the position where the service panel covers the opening to the interior.

A further non-limiting embodiment of any of the foregoing assemblies includes a lock plate of the service panel. The lock plate is configured to move from a disengaged position with the retention features to an engaged position with the retention features.

A further non-limiting embodiment of any of the foregoing assemblies includes a cover plate of the service panel. The lock plate holds the cover plate in a position that covers the opening when the lock plate is in the engaged position.

In a further non-limiting embodiment of any of the foregoing assemblies, the wall is disposed along a plane, and the lock plate moves in a direction aligned with the plane when transitioning from the disengaged position to the engaged position.

In a further non-limiting embodiment of any of the foregoing assemblies, the opening is a service opening, and the interior accommodates at least one serviceable part.

A further non-limiting embodiment of any of the foregoing assemblies includes the enclosure and the service panel as portions of a traction battery pack of an electrified vehicle.

A method according to another exemplary aspect of the present disclosure includes, among other things, transitioning a service panel to an engaged position with a retention feature to secure the service panel in a position where the service panel covers an opening in an enclosure. The retention feature is provided by a frame disposed within a wall of the enclosure.

In another example of the foregoing method, the enclosure is a polymer-based material and the frame is a metal or metal alloy.

In another example of the foregoing method, the wall is molded about at least a portion of the frame such that the frame is in-molded with the wall.

In another example of the foregoing method, the frame extends about a perimeter of the opening.

In another example of the foregoing method, the wall is disposed along a plane, and a lock plate of the service panel is moved in a direction aligned with the plane when transitioning the service panel from a disengaged position to the engaged position.

Another example of the foregoing method includes, prior to the covering, establishing the opening in the enclosure by separating a service lid from other portions of the wall. The service lid is integrally formed with the wall of the enclosure.

Another example of the foregoing method includes separating the service lid by tearing a tear strip from the wall.

In another example of the foregoing method, a serviceable component is secured to a side of the service lid that faces the interior, and a replacement component is secured to a side of the service panel. The replacement component configured to replace the serviceable component when the service lid of the wall is separated from the other portions of the wall and the service panel is in the engaged position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a service panel that can cover an opening of a traction battery pack enclosure. The opening can be a service opening established within the enclosure by removing a service lid integrally formed with the enclosure.

The service panel is secured to a frame that is at least partially disposed within the traction battery pack enclosure. The frame and the traction battery pack enclosure can be secured relative to each other by an in-molding process.

Figure 1:
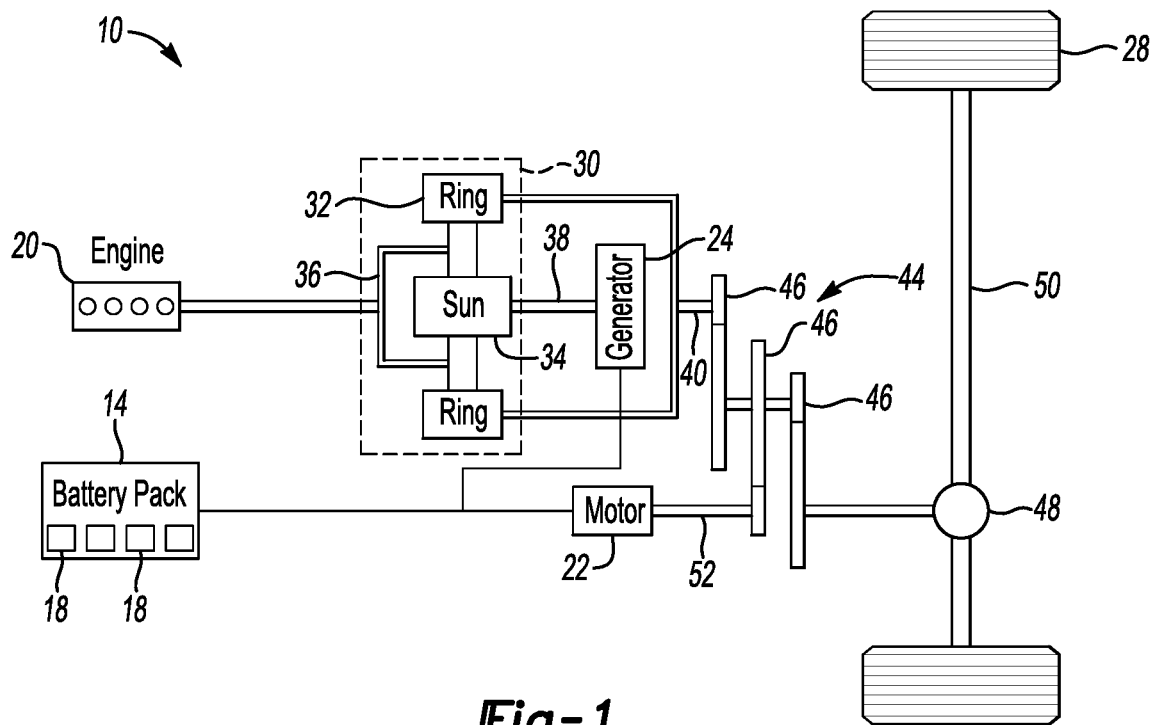
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a traction battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery pack 14.

Figure 2:
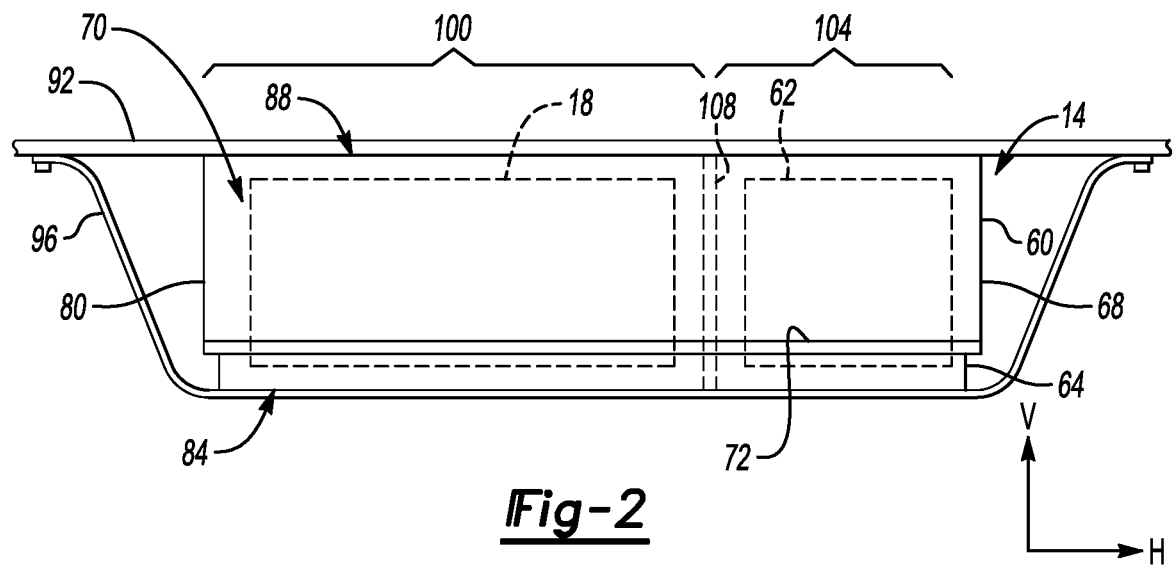
FIG. 2 illustrates a side view of a traction battery pack from the powertrain of FIG. 1 secured adjacent to a vehicle frame.
Figure 3:
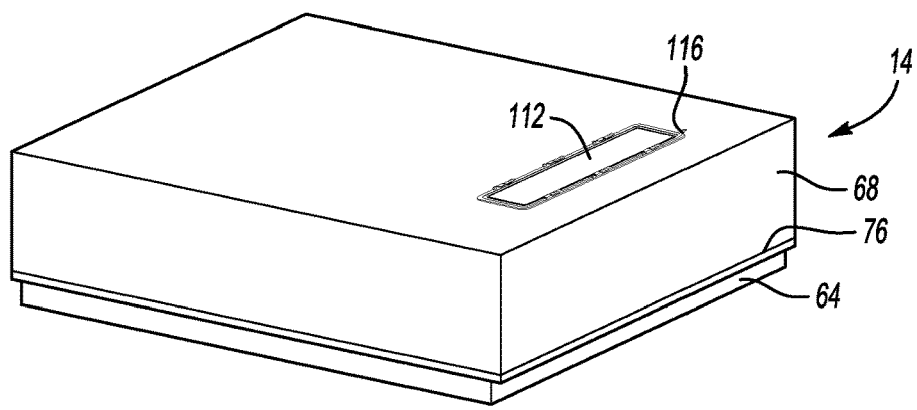
FIG. 3 illustrates a perspective view of the traction battery pack of FIG. 2.
Figure 4:
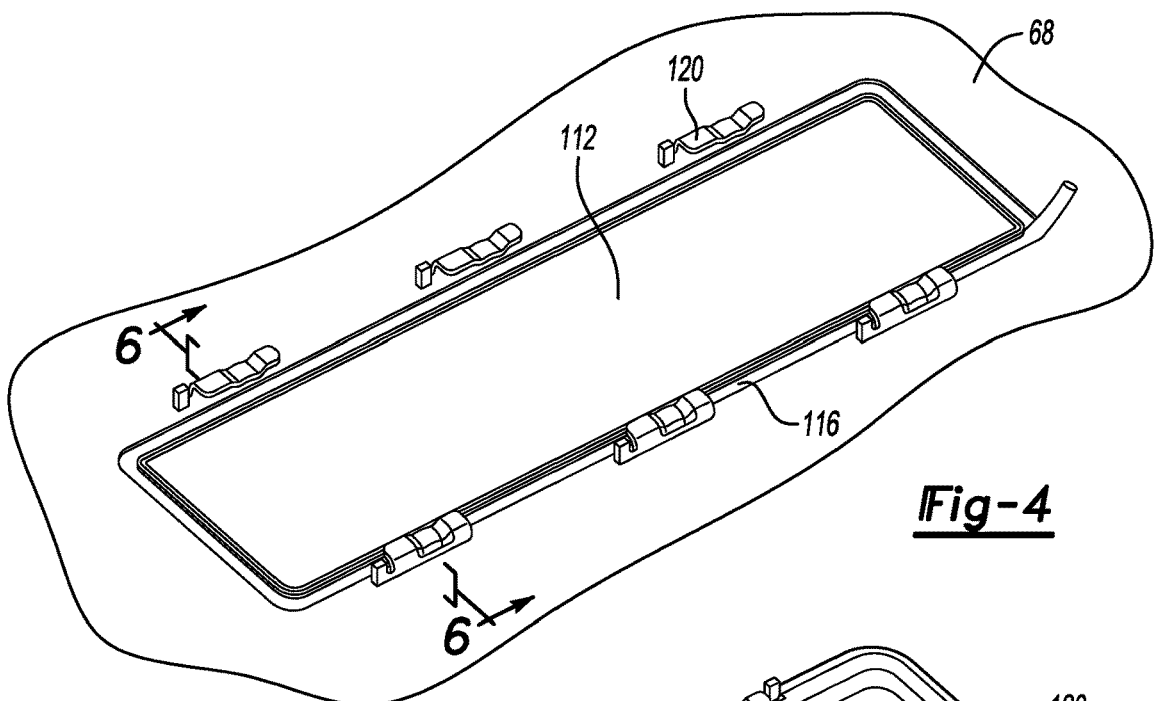
FIG. 4 illustrates a close-up view of an area of a wall of the traction battery pack of FIG. 3 incorporating a service lid and a frame that is at least partially embedded in the wall.
Figure 5:
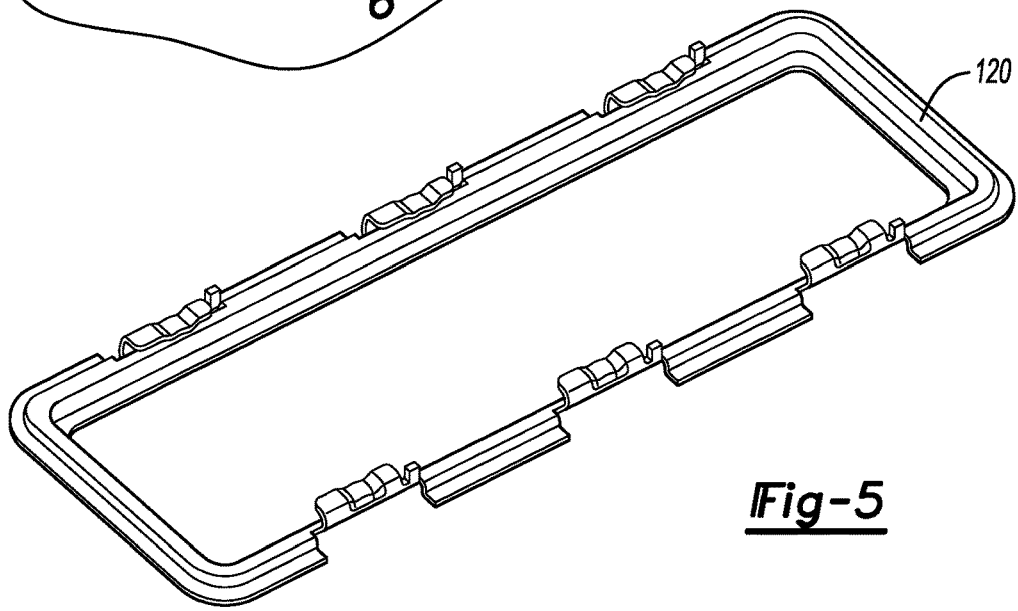
FIG. 5 illustrates a perspective view of the frame of FIG. 4.
Figure 6:
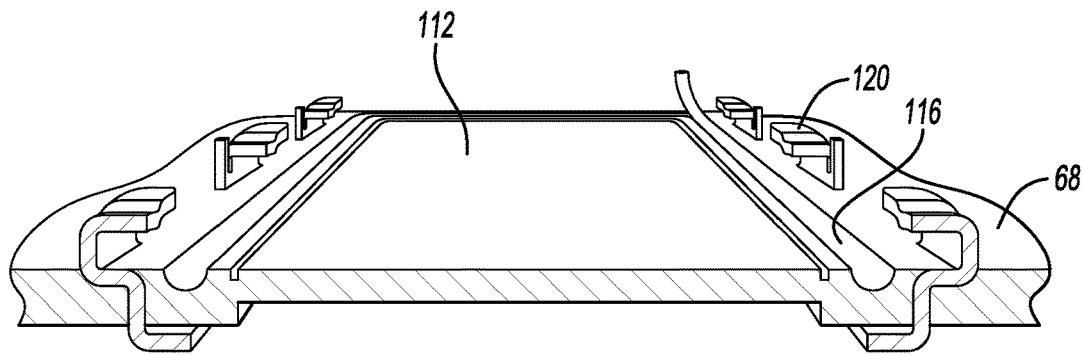
FIG. 6 illustrates a section view taken at line 6-6 in FIG. 4.
Figure 7:
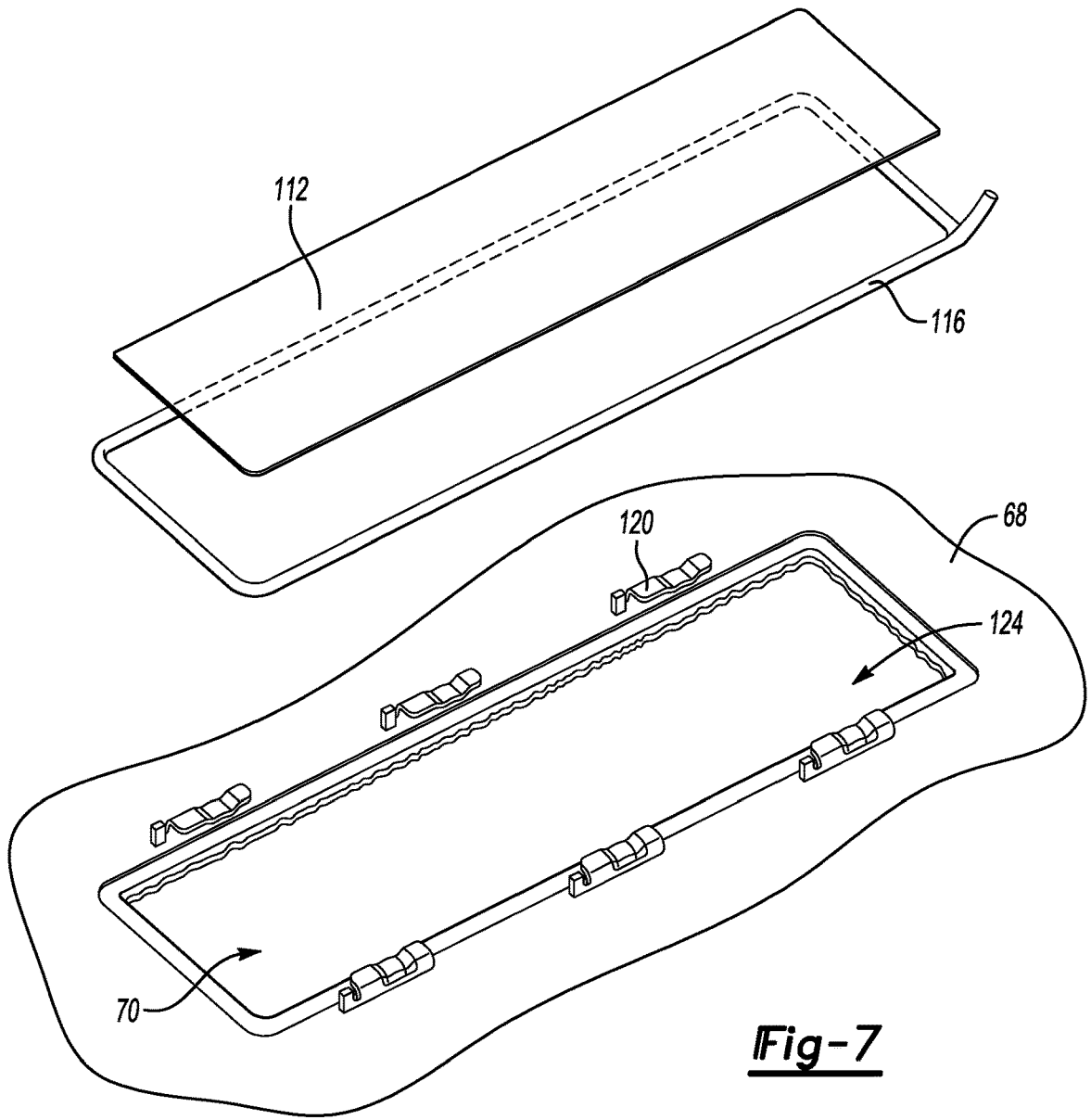
FIG. 7 illustrates the area shown in FIG. 4 with the service lid separated from the wall of the enclosure to provide an opening to an interior of the enclosure.

Referring now to FIG. 2, the traction battery pack 14 includes an enclosure 60 that houses the plurality of battery arrays 18 and other components 62. The enclosure 60 generally includes a tray 64 and a cover 68. The battery arrays 18 and the other components 62 are held within an interior 70 provided between the tray 64 and the cover 68.

In an example non-limiting embodiment, the enclosure 60 is a polymer-based enclosure, such as a thermoplastic. The exemplary enclosure 60 could be, for example, a neat, or pure, thermoplastic. In other examples, the enclosure 60 could include other types of thermoplastics and thermosets with reinforcing fibers, such as glass or carbon, or other fillers, such as talc or glass beads.

The tray 64 is hermetically sealed to the cover 68 along an interface 72. Vibration welding, laser welding, infrared welding, adhesives, or other joining methods can be used to secure the tray 64 to the cover 68 and to provide the hermetic seal. The example interface 72 extends continuously about a perimeter of the traction battery pack 14.

The enclosure 60 has a plurality of horizontally facing sides 80 extending between a bottom vertically facing side 84 and a top vertically facing side 88. In this example, the tray 64 provides the bottom vertically facing side 84 and a portion of the horizontally facing sides 80, and the cover 68 provides the top vertically facing side 88 and another portion of the horizontally facing sides 80. For purposes of this disclosure, the sides 80, 84, 88, can be considered walls of the enclosure 60. Other examples many include sides having other orientation, such as a side extending at an angle from the bottom vertically facing side 84 to the top vertically facing side 88.

Vertical and horizontal, for purposes of this disclosure are with reference to ground or the horizon. Thus, vertical, in FIG. 2, extends along a vertical axis V extending from the bottom vertically facing side 84 to the top vertically facing side 88. A horizontal axis H extends in a direction perpendicular to the vertical axis V.

The example traction battery pack 14 is held against a vehicle frame 92 by at least one strap 96. In other examples, the traction battery pack 14 is bolted or retained to the vehicle frame 92 in some other way. The strap 96 extends along the bottom vertically facing side 84 of the enclosure 60. Opposing ends of the strap 96 are secured directly to the vehicle frame 92. Securing the strap 96 to the vehicle frame 92 pulls the traction battery pack 14 vertically upward relative to the vehicle frame 92, which can compress the traction battery pack 14 between the vehicle frame 92 and the strap 96.

Within the enclosure, the battery arrays 18 are housed within an array portion 100 and the other components 62 are housed within a serviceable portion 104. The array portion 100 could be separated from the serviceable portion 104 by an interior wall 108 that is internal to the enclosure 60. The interior wall 108 separates the interior 70 into two or more distinct sections.

The components 62 within the serviceable portion 104 could include one or more of the following components: a battery control module (BCM), a bussed electrical center (BEC), a control module, electronics, high voltage electrical cabling, a fuse, a battery cell (if the battery arrays 18 are serviceable), or any other component of the traction battery pack 14. The components 62 could instead, or additionally, include other components assisting with control and/or management of the traction battery pack 14.

In this example, the components 62 are serviceable components and the battery arrays 18 are non-serviceable components. In another example, the battery arrays 18 could be serviceable components.

Serviceable components, for purposes of this disclosure, can include any component that can be repaired, replaced, or evaluated to permit continued use of the traction battery pack 14 within the powertrain 10 (FIG. 1). As can be appreciated, repair, replacement, or evaluation can require access to the serviceable component within the enclosure 60. Access points can, undesirably, provide passages for contaminants to enter the interior 70 of the enclosure 60.

Referring now to FIGS. 3-7 with continuing reference to FIG. 2, the enclosure 60 includes a service lid 112 that is integrally formed with the cover 68 of the enclosure 60. The service lid 112 can be removed to provide access to the serviceable components. The enclosure 60 includes the service lid 112 in the top vertically facing side 88 of the cover 68, in another example, the service lid 112 is in another side of the cover 68, or in the tray 64. Further, the enclosure 60 could include other service lids in addition to the service lid 112.

A tear strip 116 is circumferentially distributed about a perimeter of the service lid 112. A frame 120 is circumferentially distributed about a perimeter of the tear strip 116 and the service lid 112. The frame 120 is at least partially disposed within the cover 68 of the enclosure 60.

When access to components within the interior 70 is required, the tear strip 116 is pulled, which can separate the service lid 112 from the cover 68 to provide a service opening 124 within the cover 68. A technician can then access components 62 within the interior 70 through the service opening 124. Unless the tear strip 116 is pulled, the service lid 112 blocks contaminants from entering the interior 70 through the service opening 124. Since the service lid 112 is separated from the cover 68 when the tear strip 116 is removed, reusing the service lid 112 to cover the service opening 124 after servicing may not be possible.

In other examples, the tear strip 116 is not used and the service lid 112 is removed in some other way, such as by punching out the service lid 112, or cutting out the service lid 112.

With reference now to FIGS. 8-13, after completing the servicing of the components 62 within the interior 70, a service panel 128 can be used to cover the service opening 124. The service panel 128 is held in an engaged position with the frame 120 to hold the service panel 128 in a position covering the service opening 124.

The frame 120 can be a metal or metal alloy. The frame 120 can be another type of material that is different than a material of the cover 68. The frame 120 and the cover 68 can be secured relative to each other utilizing an in-molding process. During the in-molding, the material of the cover 68 can be cured within a mold cavity that contains the frame 120. After curing, the frame 120 is held by the cover 68, and the frame 120 is considered molded in the cover 68. No additional attachments are then required, in this example, to secure the frame 120 relative to the cover 68.

The exemplary frame 120 includes retention features 132 distributed about a perimeter of the service lid 112 and, when the service lid 112 is removed, distributed about a perimeter of the service opening 124. The retention feature 132 provide robust attachment features for securing the service panel 128 relative to the cover 68.

Figure 10:
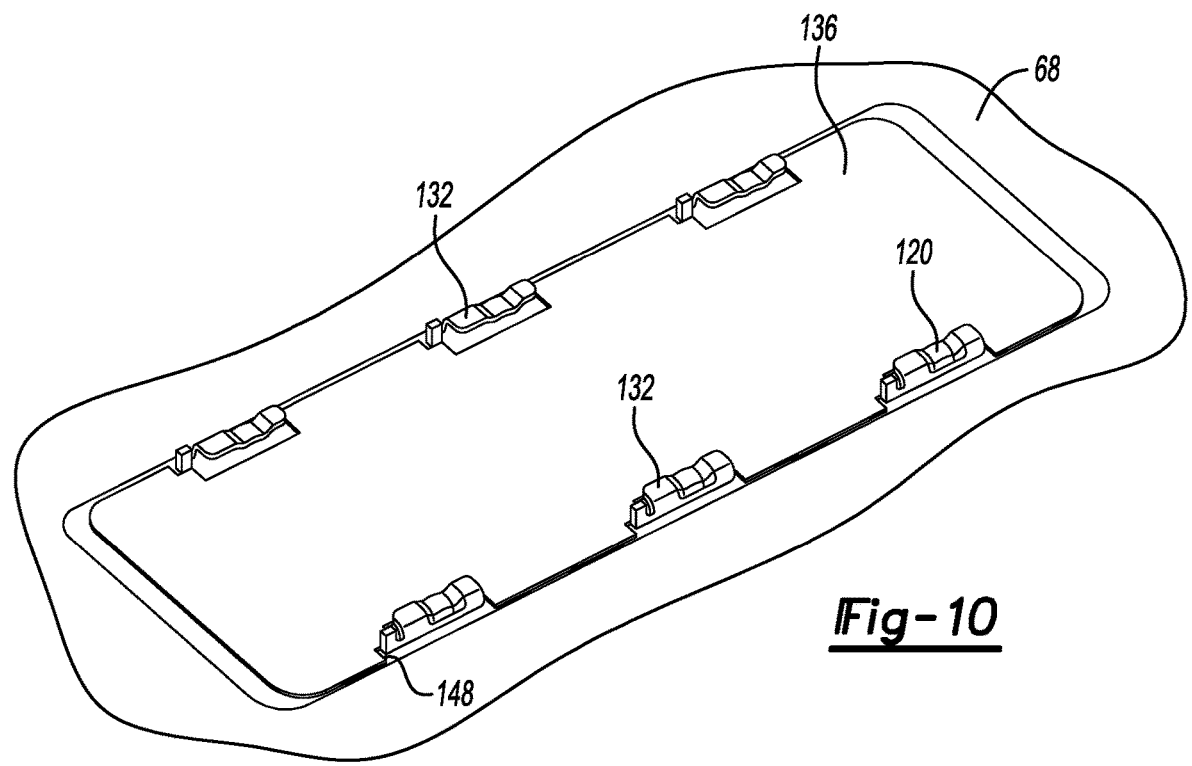
FIG. 10 illustrates the cover plate of FIG. 9 in a position where the cover plate covers the opening of FIG. 7.
Figure 11:
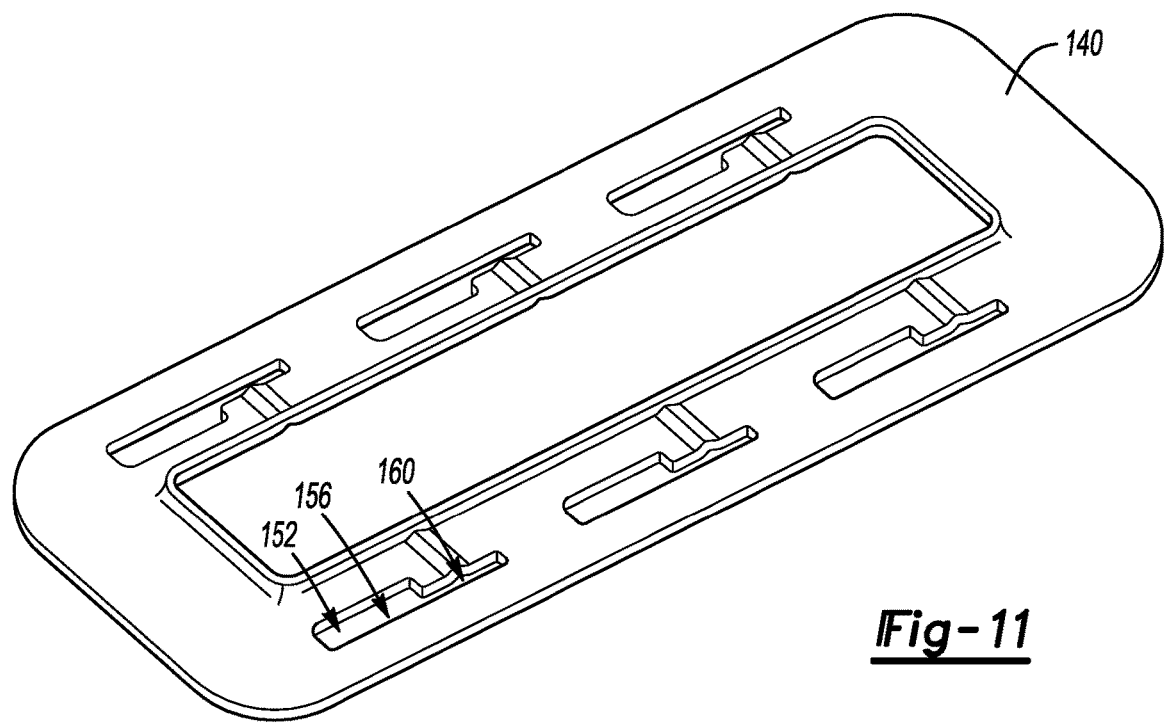
FIG. 11 illustrates a perspective view of a lock plate that transitions from a disengaged position to an engaged position with the frame to hold the cover plate in the position of FIG. 10.

The service panel 128 generally includes a cover plate 136 and a lock plate 140. When initially utilizing the service panel 128 to cover the service opening 124, the cover plate 136 is positioned over the service opening 124 as shown in FIG. 10.

A seal 144 can be utilized to seal an interface between the cover plate 136 and the cover 68. The seal 144 is initially applied to the cover plate 136 in this example. The seal 144 can be a compressible foam rubber, for example.

The cover plate 136 includes notches 148 that permit movement of the cover plate 136 against the cover 68 without interference by the retention features 132, which project slightly from a surrounding area of the cover 68.

The cover plate 136 of the service panel 128, like the enclosure 60, can be a stamped or cast metal or metal alloy. The cover plate 136 could instead be molded from a polymer-based material. The material of the composition of the cover plate 136 may differ from the precise material composition of the enclosure 60, for example, the cover plate 136 could incorporate a thermoplastic utilizing reinforcing fibers, such as a glass fiber matrix or a carbon fiber matrix, whereas the enclosure 60 can be formed from a thermoplastic without reinforcing fibers.

The cover plate 136 can additionally be reinforced or strengthened utilizing an array of strengthening ribs 150. The ribs 150 are, in this example, disposed on an interior side of the cover plate 136, and are bounded by the seal 144.

Other locations for the ribs 150 could include an exteriorly facing surface of the cover plate 136, or an area that is not bounded by the seal 144.

Figure 8:
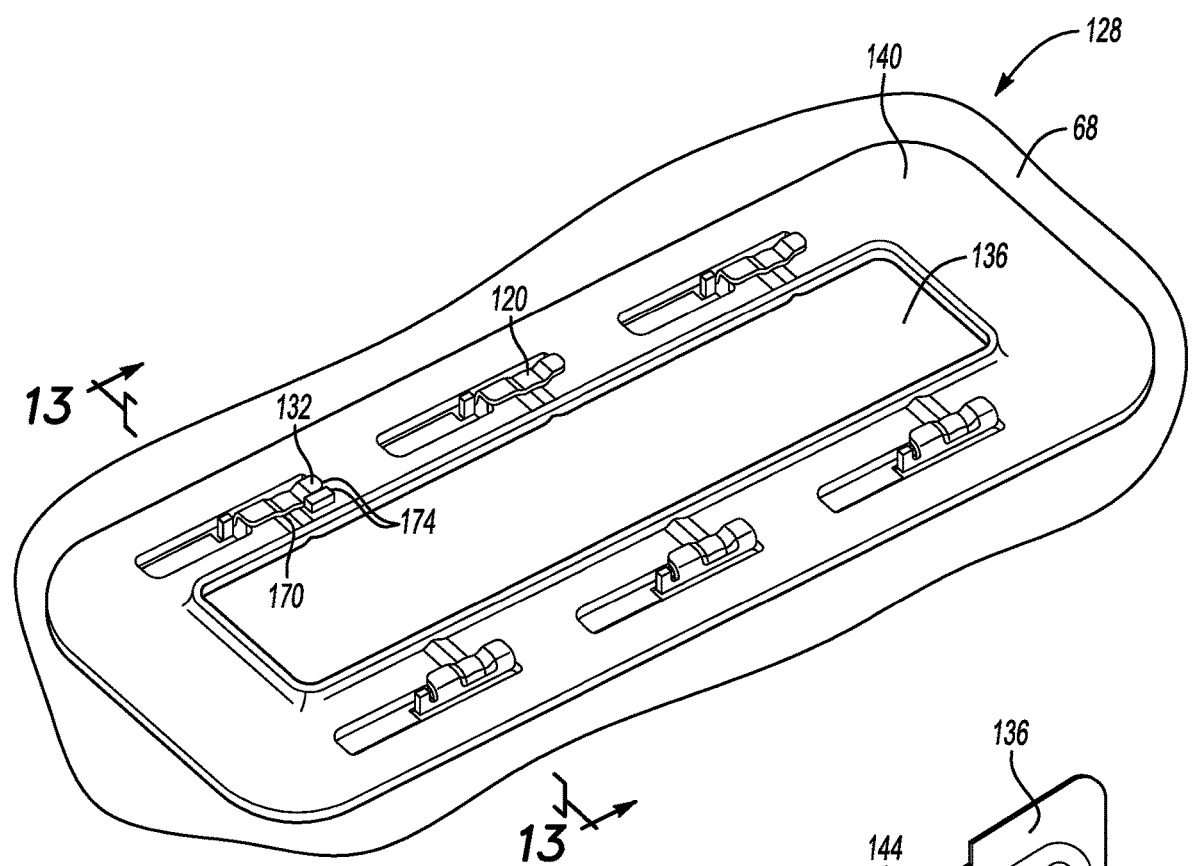
FIG. 8 illustrates a service panel covering the opening of FIG. 7.
Figure 9:
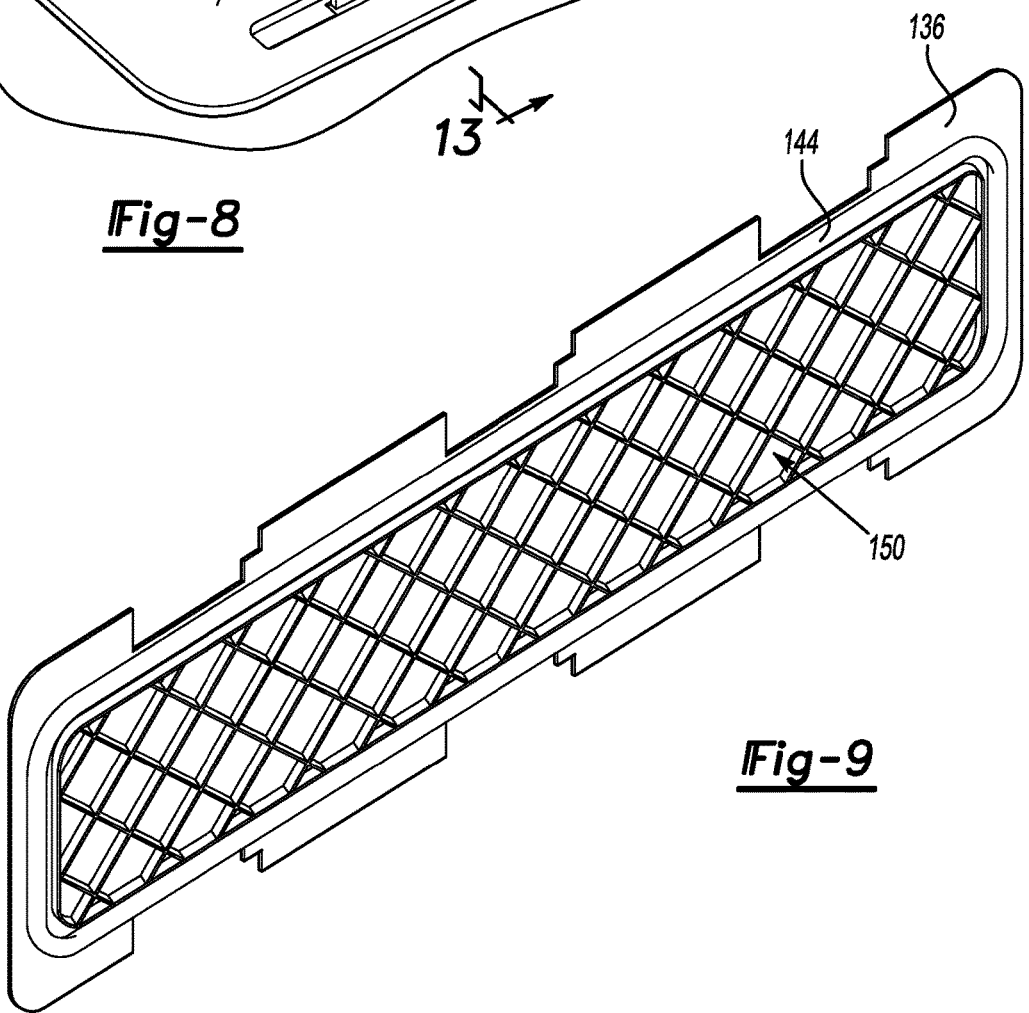
FIG. 9 illustrates a perspective view of a cover plate of the service panel.
Figure 12:
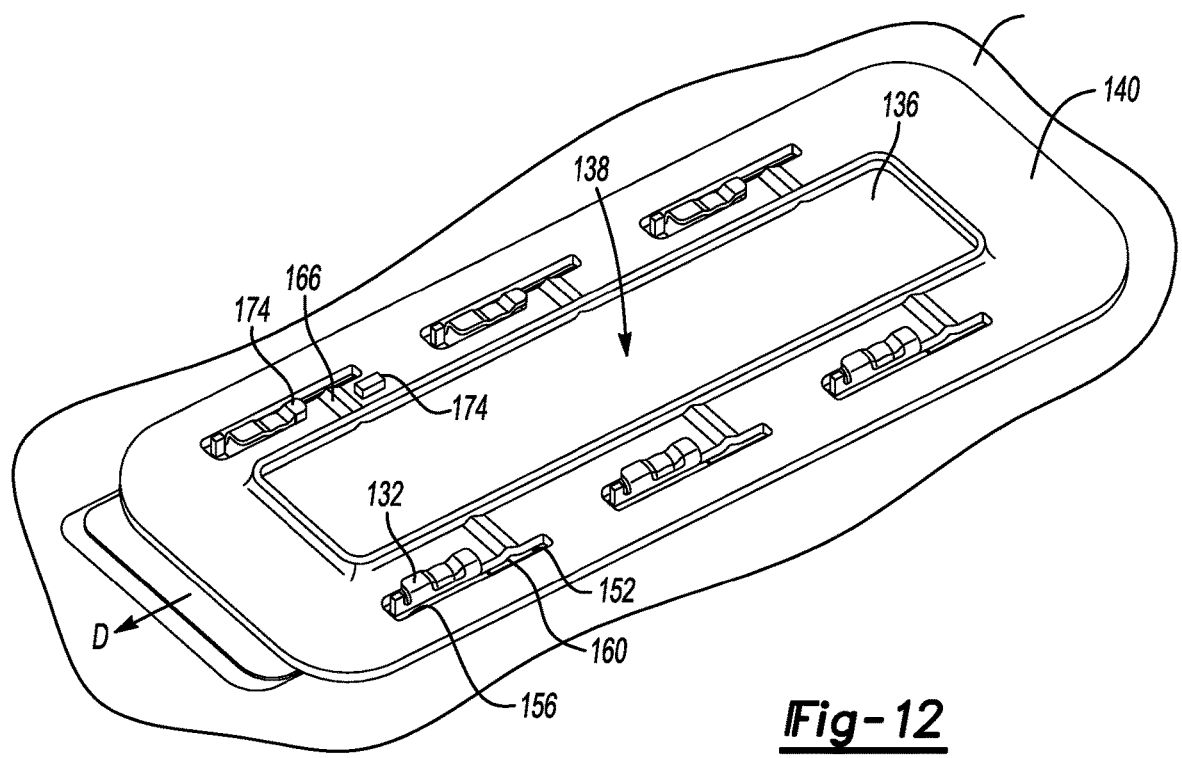
FIG. 12 illustrates the lock plate of FIG. 11 in a disengaged position.
Figure 13:
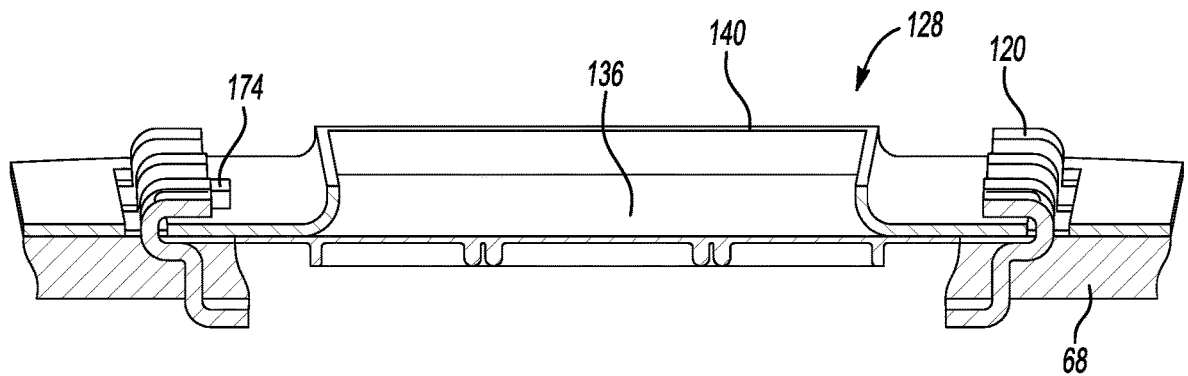
FIG. 13 illustrates a section view taken at line 13-13 in FIG. 8.

After positioning the cover plate 136, the lock plate 140 is moved from the position of FIG. 12 to the position of FIGS. 8 and 13, where the cover plate 136 is sandwiched against the cover 68. The service panel 128 is then in an engaged position with the retention features 132 of the frame 120. In the engaged position, the service panel 128 covers the service opening 124.

The lock plate 140 includes a plurality of apertures 152 having a first portion 156 that is oversized relative to the retention features 132, and a second portion 160 that is undersized relative to the retention features 132. As the lock plate 140 is initially moved to the position of FIG. 12, the retention features 132 pass through the oversized first portions 156 of the apertures 152.

Sliding the lock plate 140 in a direction D from the position of FIG. 12 to the position of FIGS. 8 and 13 repositions the retention features 132 within the undersized second portions 160 of the apertures 152. A portion of the lock plate 140 is then held between the retention features 132, and the remaining portions of the frame 120. This holds the lock plate 140 against the cover plate 136 and the cover 68. Notably, the direction D is aligned with a plane of the cover 68 in the area of the frame 120.

The lock plate 140 can include raised areas 166 associated with one or more of the apertures 152. When the lock plate 140 is in the engaged position, the raised areas 166 move into a corresponding detents 170 of the retention features 132, which inhibits movement of the lock plate 140 in the direction D, and in the direction opposite the direction D.

In some examples, a snap-lock feature could be molded into the cover 68. When the lock plate 140 is in the engaged position, the snap-lock feature helps to prevent the lock plate 140 from backing out of the engaged position.

The lock plate 140 is, in this example, a metal or metal alloy. Such material can facilitate securely attaching the service panel 128 to the retention features 132 of the frame. In other examples, the lock plate 140 could be a polymer, like the polymer-based material of the cover plate 136. If a polymer, the lock plate 140 could incorporate reinforcing fibers.

Using the lock plate 140 in combination with the cover plate 136 can provide robust attachments with the frame 120 with a relatively lightweight structure. The service panel 128 with the cover plate 136 that is polymer based is lighter than, for example, a similarly sized service panel that is all metal.

In some examples, the lock plate 140, when disengaged from the frame 120, conveys a signal to a control module that, in response, causes contactors associated with the battery pack 14 to open. This feature can facilitate blocking a technician working on the battery pack 14 through the service opening 124 from exposure to high voltages. This functionality could be implemented by a switch 174 that would open (FIG. 12) when the lock plate 140 and frame 120 are separated, and would close (FIG. 13) when the lock plate 140 and frame 120 are engaged through the metal contact of the snap-locks, or as a separate switch.

Figure 14:
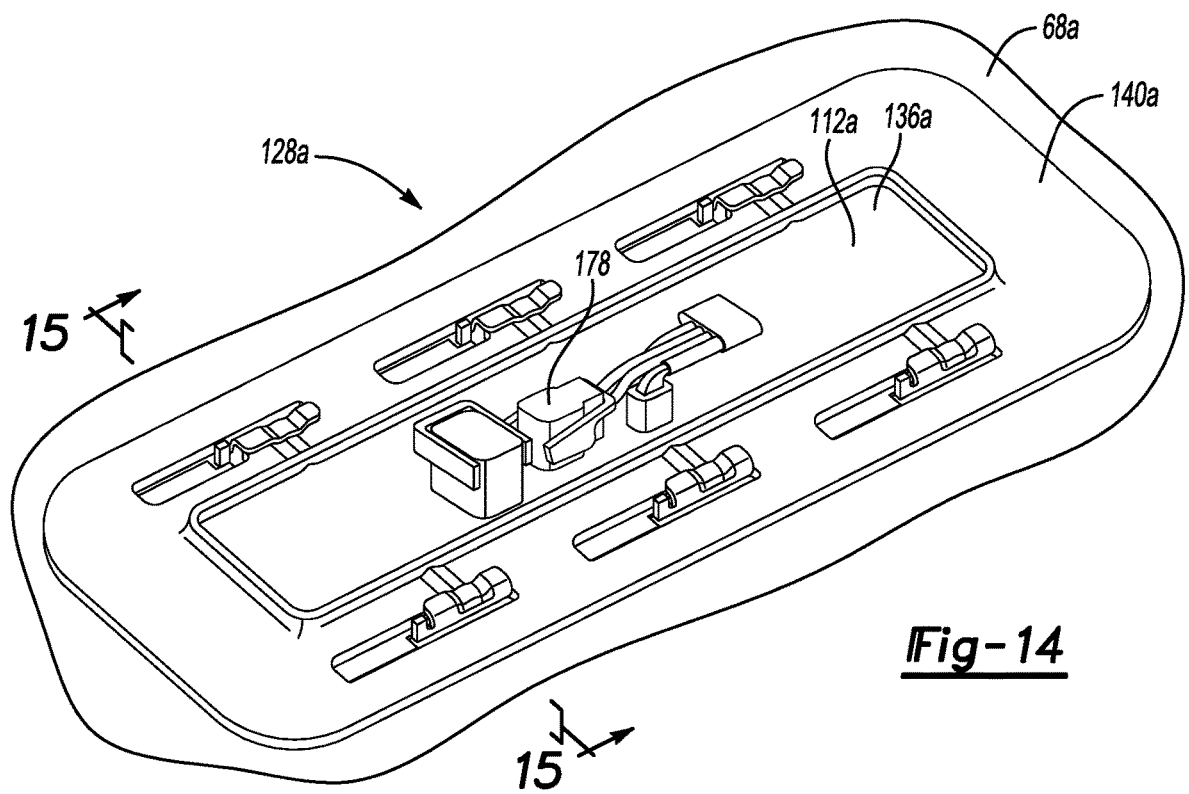
FIG. 14 illustrates a traction battery pack having a service lid portion of a wall according to another exemplary embodiment.
Figure 15:
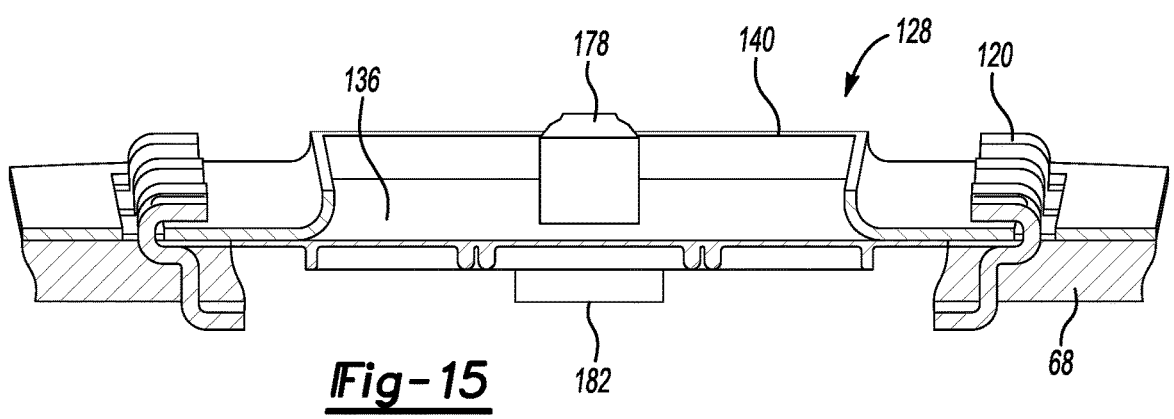
FIG. 15 illustrates a section view taken at line 15-15 in FIG. 14.
Figure 16:
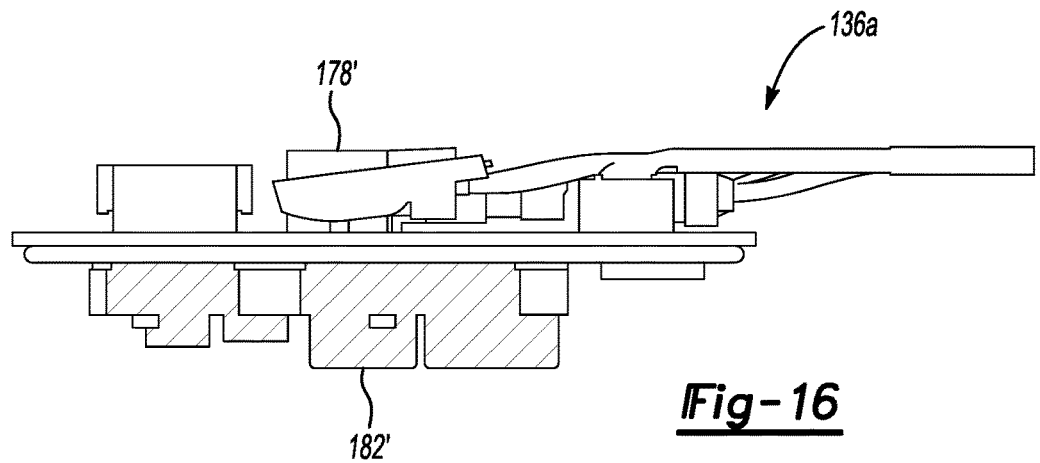
FIG. 16 illustrates a side view of a replacement cover plate that can be utilized in connection with the embodiments of FIGS. 14 and 15.

Referring now to FIGS. 14-16, a service lid 112a according to another exemplary embodiment of the present disclosure includes a connector harness 178 on an exterior side, and a module 182 on an interior facing side. The module 182 can be a BCM, for example, or some other type of module. The module 182 is integrated into the service lid 112a. The service lid 112a is a cover plate 136a of service panel 128a that can be removed from the cover 68a.

A service procedure for the module 182 could involve removing the cover plate 136a by disengaged a lock plate 140a of the service panel 128a from a frame 120a. The frame 120a, like the frame 120, can be in-molded with the cover 68.

The same cover plate 136a can then be reinstalled after the module 182 is repaired. Alternatively, the cover plate 136a can be replaced with a (new) replacement cover plate if needed. The replacement module and, optionally, a replacement connector harness are secured to the new cover plate of the service panel, which can simplify assembly.

In other examples, the module 182 could be secured to a service lid that must be removed from the remaining portions of the cover 68a, with a tear strip, for example.

The techniques described in connection with the embodiment of FIGS. 14-16 can be utilized to replace connectors, modules, and other components of a traction battery pack without substantial interactions with an interior of the battery pack.

Features of the disclosed examples include a service panel that can be used to cover a service opening of an enclosure. A frame is incorporated into the enclosure to facilitate a robust connection between the service panel and the remaining portions of the enclosure. The frame provides a relatively low-profile way to secure the service panel. In some examples, no additional mechanical fasteners are required to secure the service panel, which reduces complexity.

The service panel can optionally incorporate a replacement component to facilitate a relatively simple method for replacing a module within a traction battery pack.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
an enclosure defining an interior; and
a frame disposed within a wall of the enclosure, the frame including at least one retention feature configured to hold a service panel in a position where the service panel covers an opening to the interior, wherein the enclosure is a first material, and the frame is a second material that is different than the first material.

2. The battery assembly of claim 1, wherein the first material of the enclosure is a polymer-based material and the second material of the frame is a metal or metal alloy.

3. The battery assembly of claim 1, wherein the wall is molded about at least a portion of the frame such that the frame is in-molded with the wall.

4. The battery assembly of claim 1, wherein the frame extends continuously about an entire perimeter of the opening.

5. The battery assembly of claim 1, further comprising a service lid of the wall bounded by the frame, the service lid of the wall configured to be separated from other portions of the wall to provide the opening.

6. The battery assembly of claim 5, further comprising a tear strip of the wall bounded by the frame, wherein separating the tear strip from the wall separates the service lid from other portions of the wall.

7. The battery assembly of claim 5, further comprising a serviceable component secured to a side of the service lid that faces the interior, wherein a replacement component is secured to a side of the service panel, the replacement component configured to replace the serviceable component when the service lid of the wall is separated from the other portions of the wall and the service panel is held in the position where the service panel covers the opening to the interior.

8. The battery assembly of claim 1, wherein the opening is a service opening, and the interior accommodates at least one serviceable part.

9. The battery assembly of claim 1, wherein the enclosure and the service panel are portions of a traction battery pack of an electrified vehicle.

10. A battery assembly, comprising:
- an enclosure defining an interior;
- a frame disposed within a wall of the enclosure, the frame including at least one retention feature configured to hold a service panel in a position where the service panel covers an opening to the interior; and
- a lock plate of the service panel, the lock plate configured to move from a disengaged position with the at least one retention feature to an engaged position with the at least one retention feature.

11. The battery assembly of claim 10, further comprising a cover plate of the service panel, the lock plate holding the cover plate in a position that covers the opening when the lock plate is in the engaged position.

12. The battery assembly of claim 10, wherein the wall is disposed along a plane, and the lock plate moves in a direction aligned with the plane when transitioning from the disengaged position to the engaged position.

13. A battery assembly, comprising:
- an enclosure defining an interior, the enclosure a polymer-based material;
- a frame in-molded within a wall of the enclosure, the frame a metal or metal alloy; and
- at least one retention feature of the frame, the at least one retention feature projecting outward from the wall, the at least one retention feature configured to hold a service panel in a position where the service panel covers an opening to the interior.

\* \* \* \* \*